United States Patent
Howard et al.

(10) Patent No.: US 9,817,730 B1
(45) Date of Patent: Nov. 14, 2017

(54) STORING REQUEST PROPERTIES TO BLOCK FUTURE REQUESTS

(71) Applicant: Amazon Technologies, Inc., Seattle, WA (US)

(72) Inventors: Craig Wesley Howard, Seattle, WA (US); Matthew Graham Baldwin, Edmonds, WA (US); Donavan Miller, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 241 days.

(21) Appl. No.: 14/670,017

(22) Filed: Mar. 26, 2015

(51) Int. Cl.
*G06F 11/00* (2006.01)
*G06F 11/14* (2006.01)

(52) U.S. Cl.
CPC ...... *G06F 11/1474* (2013.01); *G06F 2201/87* (2013.01)

(58) Field of Classification Search
CPC .................................................. G06F 11/1474
See application file for complete search history.

(56) References Cited

U.S. PATENT DOCUMENTS

| | | | | |
|---|---|---|---|---|
| 5,878,202 A | * | 3/1999 | Sakuma | G06F 11/1435 710/3 |
| 2004/0128470 A1 | * | 7/2004 | Hetzler | G06F 12/0804 711/209 |
| 2013/0159497 A1 | * | 6/2013 | Butler | G06F 21/6218 709/224 |
| 2014/0096194 A1 | * | 4/2014 | Bhogavilli | H04L 63/0236 726/3 |

* cited by examiner

*Primary Examiner* — Matt Kim
*Assistant Examiner* — Katherine Lin
(74) *Attorney, Agent, or Firm* — Klarquist Sparkman, LLP

(57) ABSTRACT

The following description is directed to storing properties of requests to potentially block future requests having similar properties. In one example, a request can be received. A property of the request can be stored so that the property persists across an initialization sequence of a computer system. At least the property can be used to determine whether to block any future requests having similar properties.

20 Claims, 6 Drawing Sheets

STORING REQUEST PROPERTIES TO BLOCK FUTURE REQUESTS

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

The cloud computing facilities can be a multi-tenant environment where many different end-users can independently access the facilities using networked client devices. For example, the end-users can request services to be performed at the facilities through various application programming interfaces (APIs). The requests can be processed by server computers at the cloud computing facilities. The end-users typically desire a prompt and reliable response to their requests. However, response times to the requests can be increased as the frequency of server computer malfunctions increase. Thus, the cloud service provider may desire to reduce the frequency of server computer malfunctions in order to provide reliable and high availability services to its end-users.

DETAILED DESCRIPTION

Figure 1:
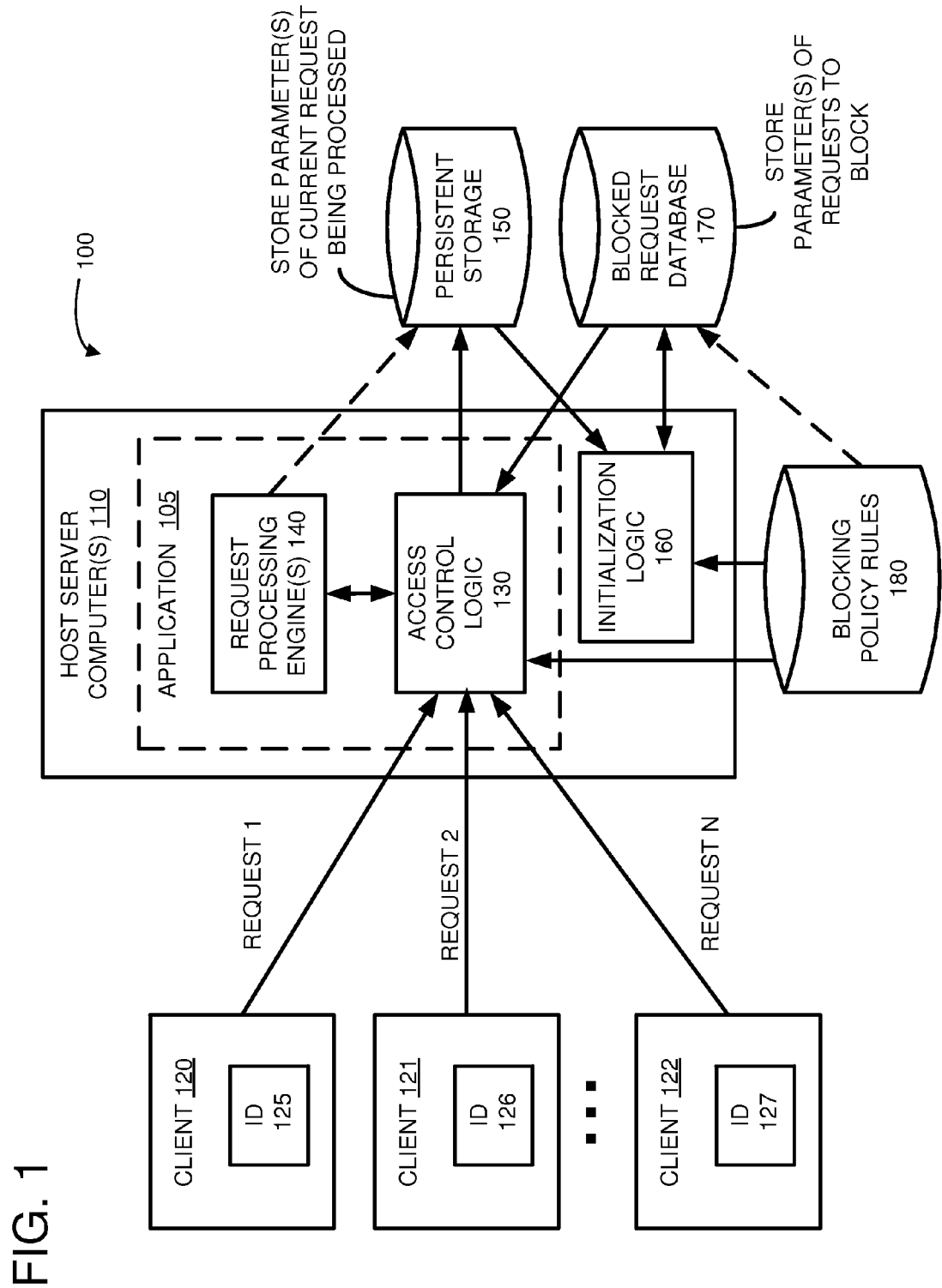
FIG. 1 is a system diagram showing an example of a system for processing requests at a host server computer.

A host server computer, such as at a cloud computing facility, can provide services, files, and information to multiple end-users using networked client devices. As specific examples, host server computers can perform Domain Name System (DNS) lookups (e.g., translate domain names to Internet Protocol (IP) addresses) or can serve cached webpages to end-users. An individual client can ask for information from the server computer by sending a request to the server computer. The server computer can receive many requests, so the server computer selects a request to process, processes the selected request, and then sends a response to the client making the request. Since the server computer is a shared resource, degradations in performance of the server computer can affect multiple end-users. For example, when the server computer malfunctions due to an error, the server computer can be unavailable to all of the end-users during a period of time when the server computer is rebooting and before the server computer can accept new requests. Thus, it can be desirable to reduce or eliminate server computer malfunctions to provide reliable and high availability services to its end-users.

A server computer malfunction or "crash" occurs when the hardware or software of the server computer encounters an error condition that cannot be recovered from without restarting the hardware and/or one or more services or processes of the server computer. Starting or booting the hardware of the server computer is initializing the hardware of the server computer and can include causing the server computer to execute the sequence of instructions that are executed when the server computer is brought from a powered down state to a powered up state. A reboot is applying the boot sequence to a server computer that is already running. Initializing a service of the server computer can include starting a new process or thread associated with the service. Reinitializing a service of the server computer can include stopping a process or thread associated with the service (such as when it is "hung" or improperly tries to access protected memory) and starting a new process or thread associated with the service.

There can be multiple different root causes of malfunctions. For example, a software programming error or "bug" can cause the server to execute instructions that are fetched from uninitialized or non-instruction memory, causing an illegal instruction exception. The software bug may be exposed by a malformed request or a request with other distinguishing properties. For example, a request that is somehow different from other requests may cause the program to exercise rarely used or incompletely tested code. This code may have an error that causes the server computer to malfunction. As another example, a hardware failure or a soft memory error may cause the server computer to malfunction. As yet another example, race conditions in hardware or software may cause the server computer to malfunction.

As described herein, server computer malfunctions can potentially be reduced by storing one or more properties of a request being processed in memory or storage that retains its contents during a malfunction and restart of a process executing on the server computer. The process executing on the server computer can be an instance of a server application for processing requests of a request-reply computing system. The restart of the process may occur without rebooting the server computer or after rebooting the server computer. The stored properties of the request can be used to block processing of similar requests in the future. For example, requests can be processed sequentially by the server computer. During the front-end or early processing of the request, a property of the request can be written to the storage (such as to a file of a hard disk drive). Typically, the request will be processed without error, and a response will be sent to the requesting client. As successive requests are processed, the property of each successive request being processed can be written to the storage, overwriting the property of the request preceding it. Eventually, an error may occur while processing one of the requests, and the process executing on the server computer will be restarted. The error can be a direct result of the processing of the request or the error may merely coincide with the processing of the request. During the restart of the process, the property of the request being processed just prior to the restart can be retrieved from the storage.

The retrieved property can be used to block processing of similar requests in the future. For example, the server computer can reject, for a period of time, any further requests with the same property as the request that was being processed during shutdown. As a specific example, the property can be a customer identifier of the request, and the server computer can reject all requests from the identified customer. While the identified customer is temporarily blocked, the other customers may benefit from improved service if the requests from the identified customer were causing the server computer to malfunction. For example, a customer whose request is causing the server computer to malfunction will typically not get a response to the request and so the customer may continue to issue the request, potentially causing a malfunction with each request. However, if the customer's request is blocked, such as by replying to the request with an error code before the request is fully processed, the server computer malfunctions can potentially be reduced and the other customers can be served with higher available systems.

Thus, the frequency of server computer malfunctions can potentially be reduced by storing properties of requests being processed by the server computer. The properties can be stored in memory or storage that retains its contents during a malfunction and process restart on the server computer. The stored properties can be used to block processing of similar requests in the future.

FIG. 1 is a system diagram showing an example of a system 100 for processing requests of an application 105 executing on a host server computer 110. The requests can come from client devices 120-122 connected over a network to the host server computer 110. The client devices 120-122 can include desktop computers, laptops, tablets, smartphones, etc. running web browsers or other client applications. The requests can be formatted according to an API of the application 105 and can be encapsulated in network packets (such as Transmission Control Protocol (TCP)/IP) for transmission from the client devices 120-122 to the host server computer 110. One or more properties can be associated with the request and the packet encapsulating the request. For example, the properties can include a protocol (such as Hypertext Transfer Protocol (HTTP)), a request type, a customer identifier, a sequence number, a memory address or range, an IP address (such as a source IP address or a target IP address), a uniform resource locator (URL), a domain name, a port number, a query string, a method or command (such as HTTP GET or HTTP PUT), a version, or any other field or quality that identifies an aspect of the request or the requestor. As a specific example, the request properties can include a customer identifier, such as identifiers 125-127 associated with clients 120-122, respectively.

The one or more properties can be a derived or calculated value that uses a field or property of the request as input. For example, a new property of the request can be calculated by using a property of the request as a key into a hash function to get a hash value. Thus, the hash value can be a property of the request derived from another property of the request. As a specific example, a customer identifier can be hashed and the hash value can be a property of the request derived from the customer identifier. While a hash is one function that can be used, other functions can also be applied to the properties of the request to calculate new properties of the request.

The application 105 can be a web service. Web services are commonly used in cloud computing. A web service is a software function provided at a network address over the web or the cloud. Clients (such as the client devices 120-122) initiate web service requests to servers (such as the host server computer 110) and servers process the requests and return appropriate responses. The client web service requests are typically initiated using, for example, an API request. An API request is a programmatic interface to a defined request-reply message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request. It should be understood that the application 105 is not limited to execution in any particular privilege level. For example, the application 105 can execute in user mode or in kernel, supervisor, system, or other privileged mode. The application 105 can execute within a virtual machine or a non-virtual machine.

The application 105 can include access control logic 130 and request processing engine(s) 140. The access control logic 130 can receive requests from the client devices 120-122 and can perform front-end or early-stage processing of the requests. For example, the front-end processing can include parsing the fields of the request to determine various properties of the request. The properties can be used to determine whether the request is authorized, which customer to bill, whether the request will be processed, where to route the request for processing, and various other actions associated with the request. For example, the application 105 can be a subscription service or a pay-per-use service. Each request can include a customer identifier or an authorization token that can be verified by the access control logic 130 in order to allow the request to be serviced and billed. The application 105 can perform multiple functions and each of the functions may be processed by different engines of the request processing engine(s) 140. Additionally or alternatively, the different request processing engine(s) 140 can be identical or nearly identical engines that process multiple requests in parallel.

The access control logic 130 can arbitrate between multiple pending requests. For example, requests may arrive in bursts and faster than the requests can be processed so that multiple requests can be ready for processing. The access control logic 130 can select one request at a time to be processed by the request processing engine(s) 140 and can "push" the requests to an available engine of the request processing engine(s) 140. As a specific example, the access control logic 130 can queue the requests in a first-in first-out order so that the earliest arriving request is serviced before the next arriving request. In one embodiment, the access control logic 130 can select multiple requests to be processed in parallel by request processing engine(s) 140, such as when an engine of the request processing engine(s) 140 is multi-threaded or when multiple engines of the request processing engine(s) 140 are available for processing. Alternatively, the access control logic 130 can maintain a data structure or otherwise signal to the request processing engine(s) 140 that requests are ready for processing. For example, the request processing engine(s) 140 can poll the access control logic 130 to determine if there are requests that can be processed by the request processing engine(s) 140. The request processing engine(s) 140 can then "pull" the available requests from the access control logic 130.

The request processing engine(s) 140 can perform a software function identified by the requests. For example, a property of the request can be a request type or a command field that is used to identify a task to be performed by the application 105. The request processing engine(s) 140 can perform the back-end processing of the request. The back-end processing of the request can include performing the identified task and formatting a response to return to the requestor. In a typical application, the majority of the processing associated with the request will be performed in the back-end.

One or more properties of the request can be stored in persistent storage 150. For example, one or more properties of the request can be stored in persistent storage 150 prior to back-end processing. As a specific example, the access control logic 130 can write the one or more properties of a particular request to the persistent storage 150 when the particular request is selected to be processed by the request processing engine(s) 140. As another example, the request processing engine(s) 140 can write the one or more properties of a particular request to the persistent storage 150 when the request processing engine(s) 140 is ready to begin the back-end processing associated with the particular request. As another example, the one or more properties of the request can be stored in persistent storage 150 in response to receiving a signal that the server computer 110 or the application 105 is about to malfunction. Specifically, the request processing engine(s) 140 can write the one or more properties of a particular request to program memory as it begins to process the request, and an interrupt service routine, triggered on the malfunction signal, can read the properties from program memory and then write the properties of the request to persistent storage 150.

It may be desirable to write the one or more properties of the request to the persistent storage 150 prior to or as early as possible in the processing of the request to increase the likelihood of capturing the properties before a malfunction of the server computer 110. For example, a malfunction may be more likely to occur when processing the bulk of the request as compared to merely parsing the properties of the request. By writing the one or more properties of a particular request to the persistent storage 150 as the server computer 110 starts to process the particular request, the one or more properties of the particular request are likely to be saved even if the application 105 malfunctions and the application 105 is restarted or the server computer 110 is rebooted. In other words, a record can be kept of the properties associated with the current request(s) being processed when the server computer 110 malfunctions. Properties associated with requests that are processed without causing a malfunction can be merely overwritten by successive requests. When a request causes a malfunction, the server computer 110 may need to be rebooted and/or the application 105 may need to be restarted.

The persistent storage 150 can retain its contents during a restart of the application 105, a process, and/or a reboot of the server computer 110. For example, the persistent storage 150 can include non-volatile memory (such as electrically erasable programmable read-only memory (EEPROM), ferroelectric random access memory (FRAM), or a hard disk drive) that retains its contents even when power is removed from the non-volatile memory. As another example, the persistent storage 150 can include volatile memory (such as dynamic random access memory (DRAM) or static random access memory (SRAM)) that remains powered and is not overwritten as the server computer 110 is rebooted. As another example, the persistent storage 150 can include volatile memory that remains powered and is not overwritten during an initialization sequence of the application 105. The persistent storage 150 can be accessible to a single server computer 110 or it can be shared by multiple server computers 110. For example, a file, an address, or a range of addresses can be assigned to each server computer 110 with access to the persistent storage 150, so that each server computer 110 can have an area of the persistent storage 150 that only it writes. The persistent storage 150 can be co-located on the same chassis as the server computer 110 or it can be located on a different chassis and connected via a network, for example.

Initialization logic 160 can read the persistent storage 150 as part of a boot or initialization sequence. The initialization logic 160 can include a boot sequence for reading and executing the sequence of instructions that are executed when power is applied to or cycled at the server computer 110. Additionally or alternatively, the initialization logic 160 can include an initialization sequence or routines for initializing the application 105. For example, the initialization routines can include enabling an instance of the application to accept requests and/or starting new processes or threads associated with the application 105. The initialization logic 160 can be initiated by hardware (such as by a power or reset button) or by software. The initialization logic 160 can be included in the application 150 (such as a start-up routine) or can be executed separately from the application 150. By reading the persistent storage 150 as part of a boot or initialization sequence, the stored properties of any request that was being processed during a malfunction of the server computer 110 or the application 105 can be captured. The request being processed during the malfunction may have caused the malfunction and so blocking the processing of similar requests may reduce or eliminate future malfunctions.

The initialization logic 160 can use at least the properties read from the persistent storage 150 to build list(s) and/or a database of request properties that may cause the server computer 110 or the application 110 to malfunction. For example, the initialization logic 160 can add the properties to a blocked request database 170. The blocked request database 170 and its contents can be shared between multiple server computers 110 so that system behavior can be observed and coordinated as opposed to isolating the information for each server computer 110 so that it acts independently of others. For example, the blocked request database 170 can reflect that a request by the same client at five different hosts/servers caused a malfunction, thus possibly providing a more accurate indication that the particular client should be blocked. In this manner, predictions regarding problematic requests may be more accurate and responses may be more appropriate. The blocked request database 170 can maintain multiple lists or data structures to track the properties of requests retrieved during a process restart or reboot of the server computer, the frequency of properties retrieved during a process restart or reboot, and the times associated with malfunctions and/or process restarts or reboots. For example, a candidate list and a blocked list can be maintained.

The blocked request database 170 can include a "blocked list" corresponding to requests to block when the request has a matching property. As a specific example, a customer identifier property of each processed request can be stored in the persistent storage 150. If a request having a customer identifier of 36 causes a malfunction, the 36 can be read from the persistent storage 150 during a restart, and the 36 can be added to the blocked list so that future requests from customer 36 can be blocked. As one example, properties can be added to the blocked list every time that the property is read from the persistent storage 150 during initialization or reboot. Thus, whether the request caused the malfunction or not, the property of the request will be placed on the blocked list when the property is read from the persistent storage 150 during initialization or reboot. However, the malfunction may be unrelated to the request whose property was stored in the persistent storage 150 during initialization or reboot. For example, the malfunction may have been caused by a different process, a soft memory error, or a race condition. If the request processing logic 140 is multithreaded, multiple properties may be stored in the persistent storage 150 corresponding to each of the requests being processed, but only one of the requests may have caused the malfunction. Thus, adding the property to the blocked list may be deferred until more evidence is collected to indicate that the request caused the malfunction.

The blocked request database 170 can include a "candidate list" corresponding to requests that may be blocked if more evidence indicates that requests having the matching property are causing the server computer 110 or the application 110 to malfunction. For example, if the property is read once after a malfunction, it may have been a coincidence that the malfunction occurred during processing of the request. On the other hand, if the property is read multiple times after a malfunction, it is less likely to have been a coincidence and more likely that the malfunction occurred because of the processing of the request. As a specific example, properties can be moved from the candidate list to the blocked list when the properties are read from the persistent storage 150 during reboot or initialization a threshold number of times within a predefined period of time. The robustness and availability targets of each system may be different (or may vary over time), so the threshold number of times and the predefined period of time can be defined in an extensible set of blocking policy rules 180. Thus, the system engineer can adjust the blocking policy rules 180 based on a desired availability of the server computer 110. Alternatively, the blocking policy rules 180 can be hard-coded or integrated with the access control logic 130. Similarly, the blocked request database 170 can be integrated with the access control logic 130.

Properties can be automatically removed from the blocked list and/or the candidate list after a period of time. Thus, requests with properties matching properties on the blocked list will not be permanently blocked. The period of time can be for a fixed period, a random period, or a combination thereof. A period of time with some randomness may be desirable so that parallel request processing servers (such as in different data centers) do not all change behavior at the same time. The blocking policy rules 180 can be used to define the period of time and whether there is a fixed and/or random component to the period of time. Additionally or alternatively, properties can be removed from the blocked list or the candidate list by a system administrator or system engineer, such as after a bug related to the request has been addressed, for example. A notification can be logged or sent to the system administrator when a property is added to or dropped from the blocked list so that the system administrator can take appropriate action.

The blocked request database 170 and the blocking policy rules 180 can be stored on removable or non-removable media, including magnetic disks, direct-attached storage, network-attached storage (NAS), storage area networks (SAN), redundant arrays of independent disks (RAID), magnetic tapes or cassettes, CD-ROMs, DVDs, or any other medium which can be used to store information in a non-transitory way and which can be accessed by the server computer 110.

The access control logic 130 can block requests from the clients 120-122 by comparing the properties of pending requests to the properties of the blocked list of the blocked request database 170. If the properties of a pending request matches any of the properties of the blocked list, then the pending request can be blocked. The degree of blocking can be adjusted based on the choice of parameter(s) to store in the persistent storage 150. For example, a relatively coarse grain filter can use a single parameter such as a customer identifier to block requests. Thus, when a given customer causes a malfunction and the customer identifier is added to the blocked list, all future requests from the customer can be blocked for a period of time. As another example, a finer grain filter can use multiple parameters such as a customer identifier and a client IP source address. Thus, when a given customer causes a malfunction when requesting from a particular IP address, future requests from the customer at the client IP address can be blocked. As another example, a customer identifier and another field of the request, such as a URL, can be used when the server computer 110 is a webpage cache. Thus, when a given customer causes a malfunction by requesting a specific URL, all future requests from the customer for the specific URL can be blocked for a period of time. However, other requests from the customer for other URLs can still be processed. There is a trade-off between making the filter too coarse (such as by using too few parameters for the comparison) and blocking requests that will not cause a malfunction and making the filter too fine (such as by using too many parameters for the comparison) and missing requests that will cause a malfunction. The blocking policy rules 180 can be used to define how many and which parameters are used for the blocking decision. Thus, a system administrator or engineer can fine-tune the degree of blocking.

Additional information can be used for the blocking decision. For example, results from earlier processing can be used in combination with request properties to potentially block later processing. As a specific example, processing of a request from a particular customer may include determining whether information for building a response to the request is stored in a cache. The server may malfunction if there is a cache hit, but not a cache miss, or vice versa. Thus, a property of the request (e.g., the customer identifier) and an intermediate result of processing (e.g., an indication of a cache hit or miss) can be stored in the persistent storage 150 before beginning later processing of the request. If the request causes a malfunction of the server computer 110, the property of the request and the intermediate result of processing can be added to the blocking list and used for the blocking decision. Adding additional information, such as intermediate processing results, to the blocking decision may reduce the number of requests that are inadvertently blocked, but it may increase the chance of a request causing a malfunction to be let through the filter. The blocking policy rules 180 can be used to define whether any and which additional information can be used for the blocking decision so that the degree of blocking can be fine-tuned.

The access control logic 130 can respond to the client devices 120-122. For example, the access control logic 130 can gather responses associated with processed requests from the request processing engine(s) 140 and forward the responses back to the client devices 120-122. As another example, the access control logic 130 can respond to the client devices 120-122 when requests are blocked by the access control logic 130. In particular, the access control logic 130 can send a response having an error code associated with a blocked request. Alternatively, the access control logic 130 can drop requests that are blocked without sending a response. A notification can be logged or sent to the system administrator when requests are blocked so that the system administrator can take appropriate action.

Figure 2:
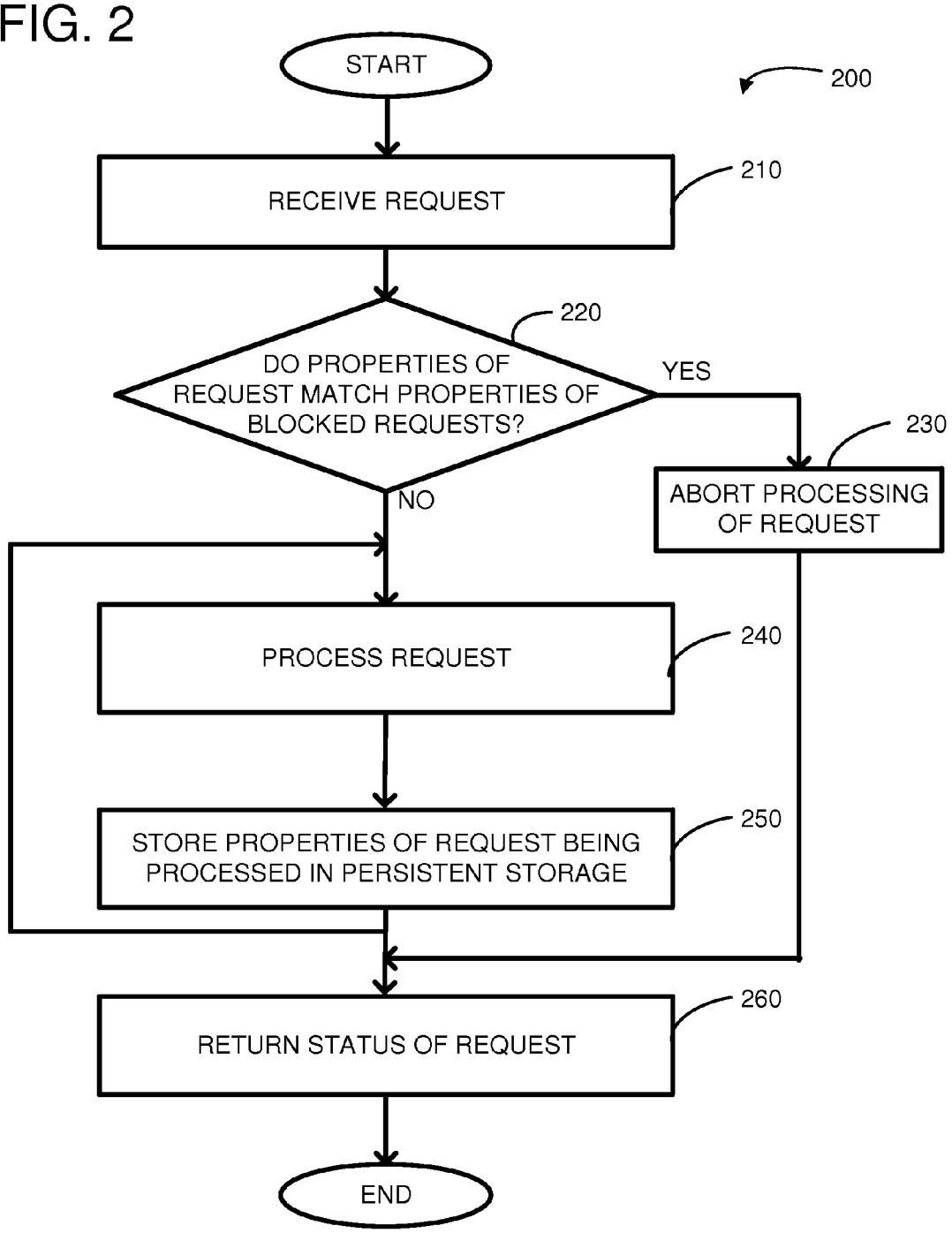
FIG. 2 is a flow diagram showing an example method of processing requests that uses persistent storage to store a property of a request that may be blocked.

FIG. 2 is a flow diagram showing an example method 200 of processing requests at a server computer, such as the server computer 110. At 210, a request is received at the server computer. For example, the request can be an API request to a web service executing on the server computer. The request can include one or more properties such as a customer identifier, a client device (such as an IP address), a type of request, a function, a data range, a file, a URL, a media type, a compression method, or fields of an encapsulating network packet, for example.

At 220, it is determined if properties of the request match properties of requests to block. The properties of requests to block may be representative of requests that have caused the service or server computer to malfunction within a period of interest. The types and number of properties to be compared can be defined in policy data, such as the blocking policy rules 180. A single property can be compared or multiple properties can be compared. If the properties of the request match properties of requests to block, the method 200 can continue at 230. Otherwise, if the properties of the request do not match properties of requests to block, the method 200 can continue at 240.

At 230, processing of the request can be blocked or aborted when properties of the request match properties of requests to block. A notification that a request was blocked can be recorded and/or sent to a system engineer. A notification that the request was blocked can be sent to the requestor by returning a response with an indication of an error (such as at 260). Alternatively, the request can be dropped without sending a response to the requestor. By blocking the request matching the properties of requests to block, the frequency of malfunctions of the server computer or service may be reduced.

At 240, all or a portion of the request can be processed. For example, the request can be processed in multiple stages or steps by looping on 240 and 250. As a specific example, during a first processing stage, fields of the request, such as a customer identifier, can be extracted; during a second stage of processing, it can be determined if the request results in a cache hit or miss; during a third stage of processing, information to complete the request can be retrieved and/or calculated; during a fourth stage of processing, a response packet can be assembled and a status code can be generated to indicate the status of the request, such as success, failure, or partial completion. After each processing stage, properties of the request can be saved in persistent storage (250) so that successively more information about the request can be saved as the request is processed. Thus, more information about a request can be saved if a malfunction occurs in later processing than if the malfunction occurs in earlier stages. By saving request properties during early request processing, it is more likely that a record of the properties will be saved before a malfunction occurs. By saving successively more detailed properties of the request during incremental request processing, false positives may be reduced and fewer requests may be blocked.

At 250, properties of the request being processed can be stored in persistent storage, such as the persistent storage 150. The persistent storage can retain its contents during a malfunction and restart of the server computer or service. For a single-threaded server computer, typically only properties of the current request being processed will be stored, as properties of earlier requests can be overwritten. Thus, if the server computer or service malfunctions while processing the current request, the initialization or boot logic can retrieve representative properties of the request being processed during the malfunction. An example of an initialization sequence is described further below with reference to FIG. 3. The properties of the request can be stored in association with other data or metadata, such as a valid bit for indicating that the request is being processed. The valid bit can be cleared when the request completes processing and if there is not another subsequent request to process. For a multi-threaded server computer, the properties of all of the requests being processed may be stored in the persistent storage. If one of the requests causes the server computer or service to malfunction, the initialization or boot logic can retrieve representative properties of the request being processed during the malfunction as well as the requests that coincidentally happened to be processed in parallel with the malfunctioning request. Thus, for multi-threaded server computers, it may be desirable to maintain a candidate list and only block requests after the properties of the request are seen at restart a threshold number of times to increase the likelihood that a blocked request is problematic.

At 260, the status of the request can be returned to the requestor. For successful requests, data may be returned with the status. For blocked requests, the status of the request can indicate that an error occurred. The error can be reported as a general error or as a blocked request error. When reported as a blocked request error, additional information can be provided, such as the properties being blocked and an amount of time until requests having the property will be processed again. The response to the request can be encapsulated in a network packet and sent to the requestor via a network.

Figure 3:
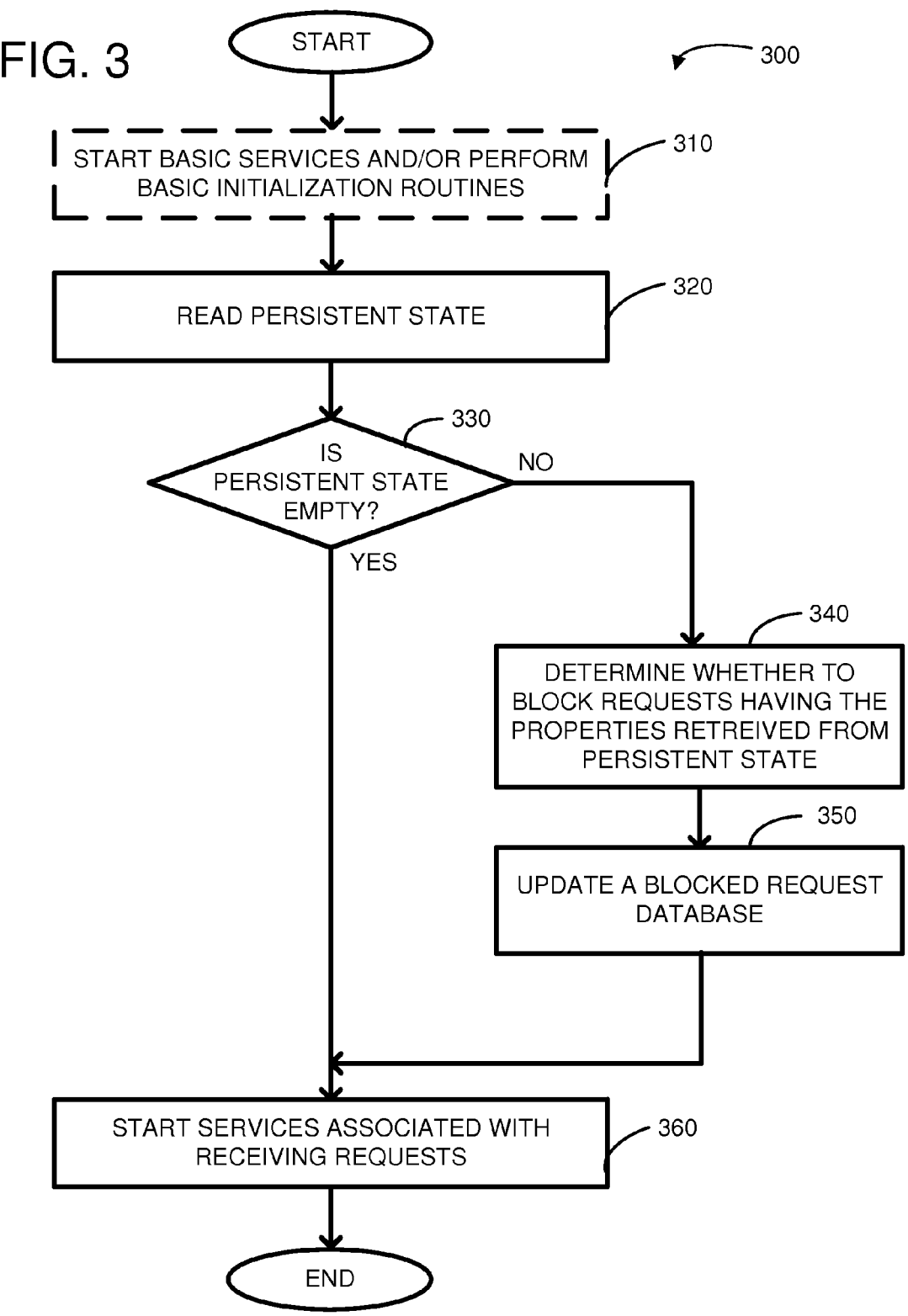
FIG. 3 is a flow diagram showing an example method of initializing a computing system.

FIG. 3 is a flow diagram showing an example method 300 of initializing a computing system, such as a request-reply computing system. Initializing a computing system can include initializing hardware and/or software of the computing system. The initialization can be a complete initialization of the computing system, such as when power is applied to (e.g., a boot) or cycled on (e.g. a reboot) the computing system. The initialization can be a partial initialization of the computing system, such as when one or more instances of applications, processes, or services of the computing system are started or restarted without rebooting the computing system.

At 310, basic services can be started and/or basic initialization routines can be performed. For example, diagnostic routines can be performed to test the state of the computing system. Diagnostic routines can include testing the hardware (including memory) and the software. As another example, basic operating system services can be started. In particular, a bootstrap loader can load the operating system kernel into memory and begin executing the operating system. As another example, memory can be allocated for applications and/or services and variables can be initialized.

At 320, the persistent state can be read. The persistent state can be a repository or cache for storing properties of requests being processed. The persistent state can retain its contents during a malfunction and restart of the computing system or processes running thereon. Thus, if a crash or malfunction of the computing system occurs during the processing of the request, a record of the properties of the request being processed can be stored in the persistent state.

At 330, the contents of the persistent state can be analyzed. If the contents of the persistent state are "empty," the method 300 can continue at 370. For example, the persistent state can be emptied by writing a null value or a reserved value into the persistent state. As another example, the persistent state can be emptied by clearing a valid bit associated with the persistent state. If the persistent state is not empty, such as when the valid bit is set, the method 300 can continue at 340.

At 340, it can be determined whether to block requests having the properties retrieved from the persistent state. For example, requests having the retrieved properties can be automatically blocked upon a single occurrence of retrieving the properties from the persistent state during the initialization sequence. As another example, requests having the retrieved properties can be blocked only after a threshold number of occurrences of retrieving the properties from the persistent state during multiple initialization sequences. A count of the number of occurrences can be based on retrieving the properties during the initialization sequences of one or multiple computing systems. In other words, multiple computing systems can share a database of request properties that may cause a malfunction of the computing systems. In this manner, the group of computing systems may detect problematic requests sooner than if the individual computing systems do not share their databases of request properties.

The threshold number of occurrences can be linked to a given window of time. For example, each occurrence can have a corresponding time-stamp indicating when the occurrence was retrieved from the persistent state or when the request having the property began to be processed. When the time-stamp of an occurrence is older or less than the current time minus the window of time, the occurrence can be subtracted from the count of the number of occurrences. Thus, if the threshold number of occurrences is not reached within the given window of time, the request having the properties may not be blocked.

At 350, a blocked request database can be updated. As described above, the blocked request database can include a blocked list having properties of requests to block, and a candidate list having properties of requests that are under consideration to be blocked. The blocked request database can be shared with multiple computing systems so that information about potentially problematic requests can be aggregated and coordinated across the multiple computing systems. Thus, properties of a request causing a malfunction on a first computing system can be used to block similar requests on a second computing system even though the second computing system may not have yet received any request with the properties.

At 360, services associated with receiving requests can be started. The services associated with receiving requests can be started after the persistent state is read and the blocked request database is updated. Thus, new requests can be blocked based on the updated blocked request database. The services associated with receiving requests can include routines for receiving and parsing network packets, determining that a request has been received, and retrieving requests from intermediate data structures, for example. As a specific example, an "epoll" instance can be created with a listening socket to watch for input events, such as receiving a request.

Figure 4:
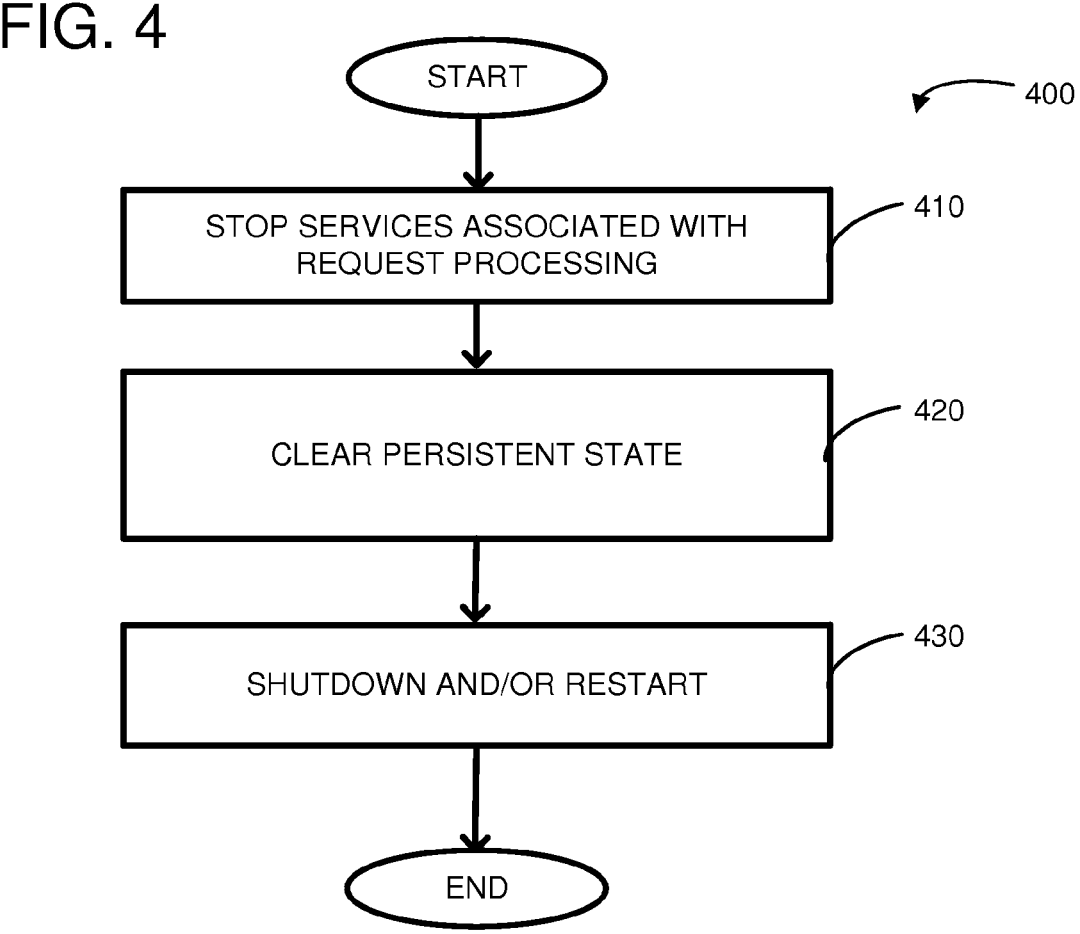
FIG. 4 is a flow diagram showing an example method of performing a graceful shutdown.

FIG. 4 is a flow diagram showing an example method 400 of performing a "graceful" shutdown of a software application or computing system. A graceful shutdown can include an intentional powering down of hardware and/or an intentional exit of a software application, process, or service. For example, the hardware can be powered down to replace a hardware component. As another example, the hardware can be powered down and rebooted so that operating system patches can be installed. As another example, a software application can be exited so that updates to the software application can be installed. As another example, a software application can be exited so that the resources of the computing system can be used for a different task. A graceful shutdown results in a normal exit and is different than and can be contrasted with a shutdown resulting in an abnormal exit caused by a computer malfunction or processing error.

At 410, services associated with request processing can be stopped. For example, the services can stop accepting new requests. Any queued requests can be allowed to complete so that all processing of the requests can stop.

At 420, the persistent state can be cleared or emptied. Clearing the persistent state is indicative of no requests being processed. The persistent state can be cleared by clearing a valid bit associated with the persistent state or by writing a reserved value to the persistent state. By clearing the persistent state before a shutdown, the initialization logic can determine that no requests were being processed when the application or system was stopped. Thus, the initialization logic can determine that a restart was not caused by a request being processed causing a computer malfunction.

At 430, the computing system and/or the software application can be shut down and/or restarted. When the computing system and/or the software application is restarted, it can perform an initialization sequence, such as described above with reference to FIG. 3.

Figure 5:
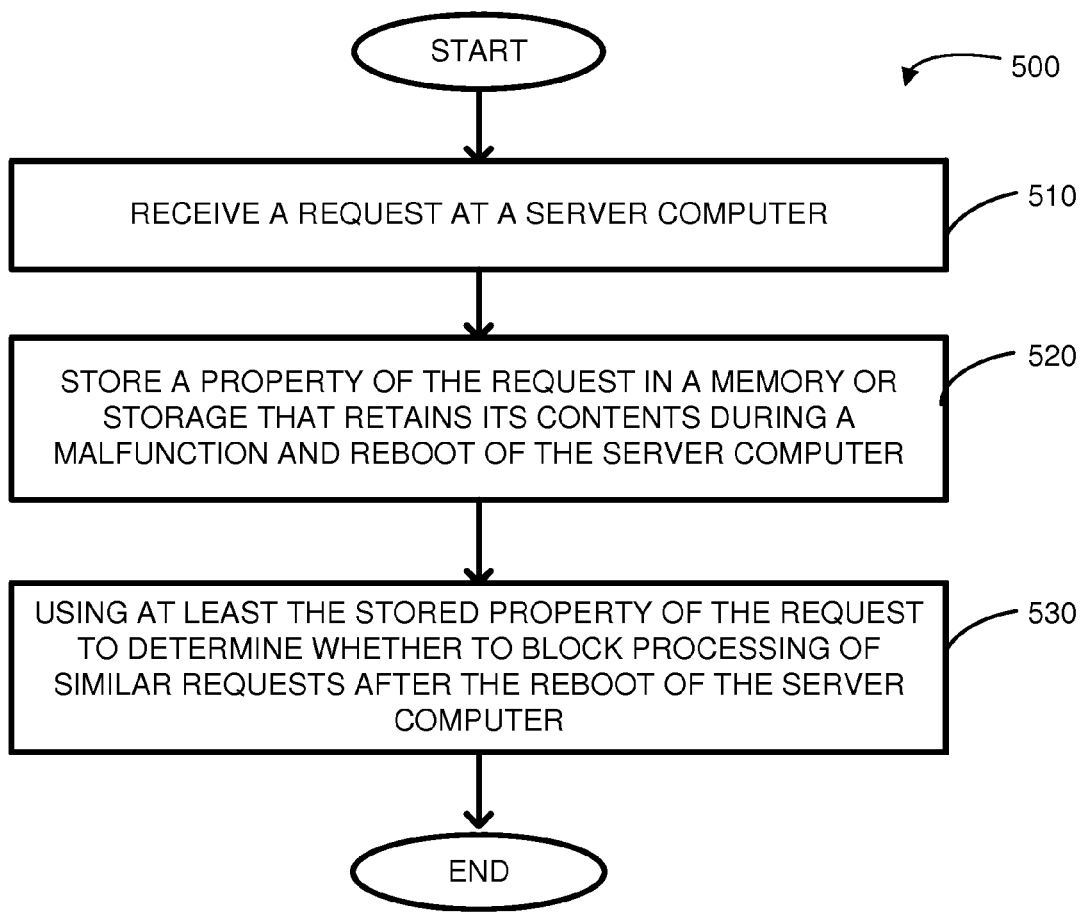
FIG. 5 is a flow diagram showing an example method of using at least a stored property of a request to block processing of similar requests.

FIG. 5 is a flow diagram showing an example method 500 of using at least a stored property of a request to block processing of similar requests. At 510, a request can be received at a server computer. For example, the request can be transmitted by a client device connected to the server computer via a network. As another example, a first software application or service can generate the request and a second software application or service can receive the request, where the first and second applications or services are executing on the server computer. The server computer can be single- or multi-threaded and can process requests sequentially and/or in parallel.

At 520, a property of the request can be stored in a memory or storage that retains its contents during a malfunction and restart of the server computer. The property of the request can be extracted directly from a field of an API request or of a network packet encapsulating the request. For example, a customer identifier or a client IP address can be the property of the request. The property of the request can be calculated from other properties of the request. For example, the property of the request can be a hash value returned by a hash function where a different property of the request was used as a key for the hash function. Multiple properties of the request can be stored in the memory or storage that retains its contents during a malfunction and restart of the server computer. The property of the request can be stored in association with other data or metadata, such as an intermediate processing result or a time-stamp. The property of the request can be defined in policy data, such as an extensible policy document, so that the properties can be adjusted as system administrators learn more about which properties are predictive of computer malfunctions.

The property of the request can be stored as processing begins or at an early stage of processing the request. Typically, subsequent requests will overwrite the property of the request as the subsequent requests are processed. Thus, the property associated with the current request being processed will typically be stored in the memory or storage that retains its contents during a malfunction and restart of hardware and/or software of the server computer. A particular request may cause a malfunction of the server computer when the server computer is processing the particular request. The server computer can be rebooted to stop the malfunctioning of the server computer and reinitialize the server computer state.

At 530, at least the stored property of the request can be used to determine whether to block processing of similar requests after the restart of the server computer. For example, during an initialization sequence, the stored property can be read from the memory or storage and added to a candidate list or a blocked list. The candidate list can be used to store properties of requests that may cause malfunctions, but more definitive proof is desired. For example, more definitive proof may include reading the property from the memory or storage more than a threshold number of times over multiple initialization sequences within a given window of time. As a specific example, a property can move from the candidate list to the blocked list if the property is seen more than once during multiple initialization sequences within a day. The blocked list can be used to block processing of requests. For example, properties of a received request can be compared to properties stored on the blocked list, and if there is a match, the request can be blocked. Blocking the request can include stopping processing of the request and responding to the request with an indication that an error occurred.

Figure 6:
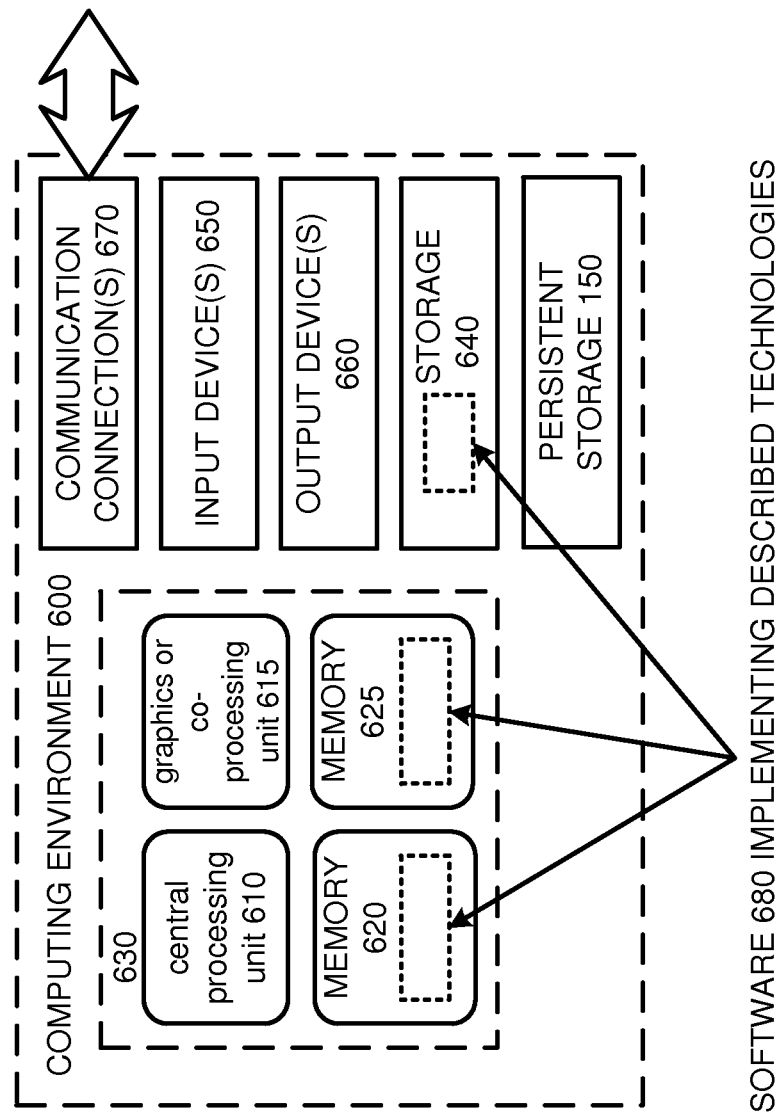
FIG. 6 depicts a generalized example of a suitable computing environment in which the described innovations may be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, etc.).

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing environment 600 includes storage 640, persistent storage 150, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 stores instructions for the software 680 implementing one or more innovations described herein.

The persistent storage 150 can retain its contents during a restart or malfunction of the computing environment 600 or the software 680. For example, the persistent storage 150 can include non-volatile memory (such as flash memory or a hard disk drive) that retains its contents even when power is removed from the non-volatile memory. As another example, the persistent storage 150 can include volatile memory (such as DRAM or SRAM) that is powered and not overwritten as the computing environment 600 is rebooted. As another example, the persistent storage 150 can include volatile memory that is powered and not overwritten during an initialization sequence of the software 680.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of a request-reply computing system, the method comprising:
   receiving a request at a server computer, the request capable of causing a malfunction associated with the server computer when the server computer is processing the request;
   maintaining a property of the request in a memory or storage that retains its contents during a malfunction and restart of a process of the server computer;
   restarting at least one process associated with the server computer after a malfunction;
   during an initialization sequence, updating a blocked request database using the maintained property of the request; and
   using the blocked request database to determine whether to block processing of subsequent requests after the restart of the at least one process of the server computer.

2. The method of claim 1, wherein the property of the request comprises a customer identifier and blocking processing of subsequent requests comprises blocking requests having a customer identifier matching the stored customer identifier.

3. The method of claim 1, wherein using the blocked request database to determine whether to block processing of subsequent requests after the restart of the at least one process of the server computer comprises determining whether a threshold number of requests having the maintained property have been captured within a predefined time interval.

4. The method of claim 1, wherein blocking processing of subsequent requests comprises blocking processing of subsequent requests at multiple server computers.

5. The method of claim 1, wherein determining whether to block processing of subsequent requests after the restart of the at least one process of the server computer comprises using the maintained properties of requests that caused other server computers to malfunction.

6. The method of claim 1, wherein the property of the request maintained in the memory or storage is derived from other properties of the request.

7. A computer-readable storage medium including instructions that upon execution cause a computer system, including at least one server computer, to:
   receive a request at the computer system; and
   maintain data associated with the request, wherein the data associated with the request persists in a repository after a malfunction associated with the computer system;
   during an initialization sequence, update a blocked request database using the maintained data associated with the request; and
   use at least the blocked request database to determine whether to block at least one future request having the same data associated with the request.

8. The computer-readable storage medium of claim 7, wherein maintaining the data associated with the request comprises writing the data associated with the request to non-volatile memory during processing of the request.

9. The computer-readable storage medium of claim 7, wherein determining whether to block future requests having the same data associated with the request comprises determining whether future requests are received within a window of time.

10. The computer-readable storage medium of claim 9, wherein the window of time is randomized.

11. The computer-readable storage medium of claim 7, wherein the data associated with the request is defined in policy data.

12. The computer-readable storage medium of claim 7, wherein blocking future requests having the same data associated with the request comprises responding with an error to the future requests having the same data associated with the request.

13. The computer-readable storage medium of claim 7, wherein determining whether to block future requests having the same data associated with the request comprises:
   counting a number of times the maintained data associated with the request is in the blocked request database after a malfunction within a predefined time interval; and
   determining whether the number of times exceeds a threshold number of times.

14. The computer-readable storage medium of claim 7, wherein the maintained data associated with the request is derived from other data associated with the request.

15. A computing system comprising:
   one or more processors;
   non-volatile storage for storing one or more properties of a request, the non-volatile storage configured to maintain its contents during an initialization sequence; and
   a computer-readable storage medium including instructions that upon execution cause the one or more processors to:
      receive the request;
      write the one or more properties of the request to the non-volatile storage during processing of the request;
      during the initialization sequence, read the one or more properties from the non-volatile storage and update a blocked request database using the one or more properties read from the non-volatile storage; and
      use at least the blocked request database to block subsequent processing of requests having similar properties.

16. The system of claim 15, wherein the instructions, upon execution, further cause the one or more processors to:
   count a number of times the one or more properties are read from the non-volatile storage within a predefined window of time; and
   add the one or more properties to a blocked list of the blocked request database if the number of times is greater than a threshold number of times.

17. The system of claim 15, wherein the one or more properties of the request includes a customer identifier.

18. The system of claim 15, wherein the subsequent processing of requests having similar properties is blocked for a randomized period of time.

19. The system of claim 15, wherein at least one of the one or more properties of the request is a hash value of another property of the request.

20. The system of claim 15, wherein the instructions, upon execution, further cause the one or more processors to clear the non-volatile storage during a graceful shutdown.

* * * * *